(12) United States Patent
Akita et al.

(10) Patent No.: US 8,802,314 B2
(45) Date of Patent: Aug. 12, 2014

(54) REINFORCED ELECTROLYTE MEMBRANE FOR FUEL CELL, MEMBRANE-ELECTRODE ASSEMBLY FOR FUEL CELL, AND POLYMER ELECTROLYTE FUEL CELL COMPRISING THE SAME

(75) Inventors: Yasuhiro Akita, Nagoya (JP); Masanori Aimu, Toyota (JP); Tatsuya Kawahara, Toyota (JP); Takeshi Nagasawa, Okazaki (JP); Toyohiro Matsuura, Okayama (JP); Takeyuki Suzuki, Okayama (JP); Hiroshi Kato, Okayama (JP); Hideki Yamada, Akaiwa (JP)

(73) Assignees: Toyota Jidosha Kabushiki Kaisha, Toyota-Shi (JP); W.L. Gore & Associates, Co., Ltd., Tokyo (JP)

( * ) Notice: Subject to any disclaimer, the term of this patent is extended or adjusted under 35 U.S.C. 154(b) by 398 days.

(21) Appl. No.: 13/124,602

(22) PCT Filed: Oct. 15, 2009

(86) PCT No.: PCT/JP2009/067828
§ 371 (c)(1),
(2), (4) Date: Aug. 1, 2011

(87) PCT Pub. No.: WO2010/044436
PCT Pub. Date: Apr. 22, 2010

(65) Prior Publication Data
US 2011/0287335 A1    Nov. 24, 2011

(30) Foreign Application Priority Data
Oct. 17, 2008   (JP) .................................. 2008-269094

(51) Int. Cl.
*H01M 8/10*  (2006.01)

(52) U.S. Cl.
CPC ....................................... *H01M 8/10* (2013.01)
USPC ......................................................... 429/482

(58) Field of Classification Search
CPC ........................................................ H01M 8/10
USPC ......................................................... 429/482
See application file for complete search history.

(56) References Cited

U.S. PATENT DOCUMENTS 5,476,589 A    12/1995   Bacino
6,613,203 B1   9/2003    Hobson et al.

(Continued)

FOREIGN PATENT DOCUMENTS

CA    2596007 A1    8/2006
CA    2659968   *   3/2008

(Continued)

OTHER PUBLICATIONS

International Search Report, Dec. 1, 2009.

(Continued)

*Primary Examiner* — Gary Harris
(74) *Attorney, Agent, or Firm* — Kenyon & Kenyon LLP

(57) ABSTRACT

It is an object of the present invention to provide a fuel cell electrolyte membrane reinforced with a porous substrate which has excellent durability and in which the amount of cross leakage as a result of chemical deterioration of electrolyte membrane components due to the presence of peroxide and/or radicals is particularly reduced. The present invention relates to an electrolyte membrane for a fuel cell comprising a polyelectrolyte, which contains a porous substrate and a radical scavenger dispersed in the polyelectrolyte.

13 Claims, 4 Drawing Sheets

(56) References Cited

U.S. PATENT DOCUMENTS

| | | |
|---|---|---|
| 2003/0008198 A1 | 1/2003 | Mukoyama et al. |
| 2003/0013774 A1 | 1/2003 | Mukoyama et al. |
| 2003/0082308 A1 | 5/2003 | Kinoshita et al. |
| 2003/0152820 A1 | 8/2003 | Kato |
| 2004/0045814 A1 | 3/2004 | Bahar et al. |
| 2004/0084304 A1 | 5/2004 | Thompson |
| 2005/0227132 A1 | 10/2005 | Hori et al. |
| 2006/0040175 A1 | 2/2006 | Zuckerbrod et al. |
| 2008/0138685 A1 | 6/2008 | Kaneko et al. |
| 2009/0208806 A1 | 8/2009 | Izuhara et al. |
| 2011/0008708 A1* | 1/2011 | Akita et al. ............... 429/483 |

FOREIGN PATENT DOCUMENTS

| | | |
|---|---|---|
| CA | 2659968 A1 | 3/2008 |
| CN | 1608099 A | 4/2005 |
| CN | 1926705 A | 3/2007 |
| CN | 101120419 A | 2/2008 |
| DE | 60215554 T2 | 7/2007 |
| JP | 2003-051320 A | 2/2003 |
| JP | 2003-055568 A | 2/2003 |
| JP | 2003-100318 A | 4/2003 |
| JP | 2003-297394 A | 10/2003 |
| JP | 2004-178995 A | 6/2004 |
| JP | 2004-288495 A | 10/2004 |
| JP | 2005-050561 A | 2/2005 |
| JP | 2005-520002 A | 7/2005 |
| JP | 2005-235437 A | 9/2005 |
| JP | 2005-267904 A | 9/2005 |
| JP | 2005-276847 A | 10/2005 |
| JP | 2005-285757 A | 10/2005 |
| JP | 2006-032157 A | 2/2006 |
| JP | 2006-504848 A | 2/2006 |
| JP | 2006-059756 A | 3/2006 |
| JP | 2007-042584 A | 2/2007 |
| JP | 2007-095433 A | 4/2007 |
| JP | 2007095433 A * | 4/2007 |
| JP | 2007-112907 A | 5/2007 |
| JP | 2007-280688 A | 10/2007 |
| JP | 2008-027586 A | 2/2008 |
| JP | 2008-078091 A | 4/2008 |
| JP | 2008-098006 A | 4/2008 |
| WO | 03/022912 A2 | 3/2003 |
| WO | 2004/041529 A1 | 5/2004 |
| WO | 2006-087995 A1 | 8/2006 |
| WO | 2007-007819 A1 | 1/2007 |
| WO | 2008026666 A1 | 3/2008 |

OTHER PUBLICATIONS

R. Iwata et al., "Study of the Perfluorosulfonic Acid Membrane Degradation and Development of Highly Durable Nafion Membrane," (Abstract) Fuel Cell Symposium, pp. 105-107 (2006).

Office Action dated Aug. 29, 2012 of U.S. Appl. No. 12/919,276.

Advisory Action dated Sep. 20, 2013, issued in U.S. Appl. No. 12/919,276.

Notice of Allowance issued on Jan. 2, 2014, in U.S. Appl. No. 12/919,276.

* cited by examiner

REINFORCED ELECTROLYTE MEMBRANE FOR FUEL CELL, MEMBRANE-ELECTRODE ASSEMBLY FOR FUEL CELL, AND POLYMER ELECTROLYTE FUEL CELL COMPRISING THE SAME

This is a 371 national phase application of PCT/JP2009/067828 filed 15 Oct. 2009, claiming priority to Japanese Patent Application No. 2008-269094 filed 17 Oct. 2008, the contents of which are incorporated herein by reference.

TECHNICAL FIELD

The present invention relates to a reinforced electrolyte membrane used for a fuel cell, a membrane-electrode assembly for a fuel cell, and a polymer electrolyte fuel cell comprising the same.

BACKGROUND ART

A polymer electrolyte fuel cell has a structure in which a polymer electrolyte membrane is used as an electrolyte and the both sides of the membrane are bound to electrodes.

It is necessary for a polymer electrolyte membrane to have low membrane resistance when used for a fuel cell. For this reason, it is preferable that the membrane thickness be minimized. However, excessive reduction of membrane thickness is liable to result in pinhole formation during membrane making, membrane breakage during electrode making, or short circuits between electrodes, which has been problematic. In addition, whenever polymer electrolyte membranes are used for fuel cells, they are in a moist state. Therefore, moistening causes, for example, swelling or deformation of polymer electrolyte membranes. This causes problems of durability in terms of pressure resistance, cross-leakage, or the like during a differential pressure operation.

Hence, a thin reinforced membrane with a uniform thickness having uniform strength in both the longitudinal and lateral directions has been developed. For example, Patent Document 1 discloses a polymer fuel cell electrolyte membrane comprising a composite for which the tensile yield stress is 12 MPa or more in the longitudinal and lateral directions and the relative value of the tensile yield stress in the longitudinal direction to the tensile yield stress in the lateral direction (tensile yield stress in the longitudinal direction/tensile yield stress in the lateral direction) is 2.0 or less.

Meanwhile, Patent Document 2 discloses, as an ion conductive diaphragm having a high degree of hardness and dimensional stability, a composite diaphragm obtained by allowing an integrated composite diaphragm comprising stretched/expanded polytetrafluoroethylene, which has a morphological structure characterized by a fine structure of nodes with ultra-high extensibility (such nodes being bound to each other via fibrils), to absorb ionomers. It is also disclosed that a composite membrane has extraordinarily improved hardness so as to reduce the occurrence of electric short circuits, thereby improving fuel cell performance and durability.

In general, it has been attempted to form a composite of a porous body such as stretched polytetrafluoroethylene and an electrolyte material so as to reduce the occurrence of electric short circuits, thereby improving performance and durability. However, the porous body structure becomes composite. In order to further improve membrane strength, proton conductivity (specifically, fuel cell performance) must be sacrificed, which is problematic.

Further, a polyelectrolyte material having high proton conductivity and excellent durability has been examined. However, when chemical resistance is imparted to such a membrane, the polymer structure becomes composite. This causes concerns of yield deterioration in the synthesis process and a sharp increase in material cost for synthesis of a novel material or the like. Furthermore, it cannot be said that sufficient polyelectrolyte material strength is achieved in such case. In addition to such problems, a membrane obtained by making a composite of a polytetrafluoroethylene porous body and an electrolyte material has a membrane face with strength anisotropy. Accordingly, such membrane tends to become distorted in fuel cells, facilitating membrane deformation or destruction, which has been problematic.

The above problems have arisen due to lack of simultaneous achievement of improvement of electrolyte membrane strength and provision of chemical resistance. In addition, in order to improve strength based on conventional technology, it is necessary to increase the porous substrate thickness or change the fine porous substrate structure.

Hitherto, porosity has been imparted to polytetrafluoroethylene porous substrates by a stretching method. This often results in a difference between the degree of stretching in the machine direction (for sheet making) (MD) and that in the transverse direction (TD; vertical to the MD direction). Therefore, it has been thought that it would be difficult to change the fine structure or reduce strength anisotropy in the MD and TD.

As an aside, a cell reaction causes generation of peroxide in a catalyst layer formed at the interface between a polymer electrolyte membrane and an electrode in a polymer electrolyte fuel cell. The generated peroxide is dispersed therein, giving rise to the formation of peroxide radicals, and resulting in deterioration of the electrolyte. For instance, oxidation of fuel takes place at the fuel electrode and reduction of oxygen takes place at the oxygen electrode in a fuel cell. The following equations (1) and (2) represent ideal oxidation and reduction reactions, respectively, when hydrogen serving as fuel and an acidic electrolyte are used.

$$\text{Anode(hydrogen electrode):} H_2 \rightarrow 2H^+ + 2e^- \quad (1)$$

$$\text{Cathode(oxygen electrode):} 2H^+ + 2e^- + (\tfrac{1}{2})O_2 \rightarrow H_2O \quad (2)$$

Protons generated at the anode as a result of reaction (1) are hydrated to form $H^+(xH_2O)$ so as to permeate (or to be dispersed in) a polymer electrolyte membrane. The protons that have permeated the membrane are subjected to reaction (2) at the cathode. These electrode reactions at the anode and the cathode take place in a reaction site in an electrode catalyst layer tightly adhering to a polymer electrolyte membrane and progress at the interface between a catalyst and a polymer electrolyte membrane in the electrode catalyst layer.

However, in addition to such main reactions, side reactions take place in actual fuel cells. One representative side reaction causes generation of hydrogen peroxide ($H_2O_2$). Although the mechanism of such generation of hydrogen peroxide has not been completely elucidated, the probable mechanism can be explained as follows. Specifically, generation of hydrogen peroxide can take place at either the hydrogen electrode or the oxygen electrode. For instance, it is thought that hydrogen peroxide is generated at the oxygen electrode as a result of an incomplete oxygen reduction reaction represented by the following formula.

$$O_2 + 2H^+ + 2e^- \rightarrow 2H_2O_2 \quad (3)$$

In addition, oxygen contained as an impurity in a gas or mixed with a gas for a specific purpose or oxygen dissolved in an electrolyte at the oxygen electrode and thus dispersed toward the hydrogen electrode is thought to be involved in a reaction at the hydrogen electrode. The reaction formula for such reaction can be the same as formula (3) above, or it can be the following formula.

$$2M-H+O_2 \rightarrow 2M+H_2O_2 \qquad (4)$$

Here, "M" represents a catalyst metal used at the hydrogen electrode. "M–H" represents such catalyst metal to which hydrogen has adsorbed. In general, a noble metal such as platinum (Pt) is used as a catalyst metal.

Hydrogen peroxide generated at either electrode is released from the electrode so as to be dispersed, for example, and it is transferred into an electrolyte. Hydrogen peroxide is a substance having a strong oxidizability and therefore it oxidizes many of the organic substances constituting an electrolyte. Details of the oxidation mechanism have not been completely elucidated. However, in many cases, hydrogen peroxide radical formation takes place and the resulting hydrogen peroxide radical directly serves as a reactant in an oxidation reaction. That is, it is thought that a radical generated by the formula given below removes hydrogen from organic substances of an electrolyte or cleaves other bonds. Although the cause of radical formation has not been completely elucidated, it is thought that hydrogen peroxide in contact with heavy metal ions has catalyst activity. In addition, it is thought that heat, light, and the like can cause radical formation.

$$H_2O_2 \rightarrow 2 \cdot OH$$

or $$H_2O_2 \rightarrow \cdot H + \cdot OOH$$

As described above, an electrolyte membrane for a fuel cell is required to contribute to the improvement of durability (the reduction of fluorine emissions and the prevention of increases in cross-leakage) and the improvement of output (the prevention of decreases in proton conductivity).

It has been revealed that chemical deterioration of an electrolyte membrane caused by hydrogen peroxide-derived radicals can be inhibited with the addition of Ce (cerium) or a Ce compound to an electrolyte membrane or MEA, leading to the significant improvement of durability.

For instance, Patent Document 3 discloses that a peroxide decomposition catalyst capable of decomposing peroxide is provided to at least one of a pair of electrodes that constitute a membrane-electrode assembly for a polymer electrolyte fuel cell in a manner such that concentration gradient diffusion takes place. This is intended to efficiently decompose peroxide generated in a fuel cell and to inhibit the deterioration of an electrode and an electrolyte membrane.

Specifically, a peroxide decomposition catalyst is provided to an electrode such that concentration gradient diffusion takes place in the electrode. Concentration gradient diffusion may take place in the thickness direction or in the lateral direction of the electrode. Patent Document 3 describes that it is particularly desirable that a peroxide decomposition catalyst be provided to an electrode such that concentration gradient diffusion takes place in the thickness direction of the electrode (paragraph nos. 0021 and 0022).

In addition, Patent Document 4 discloses that a peroxide decomposition catalyst capable of decomposing peroxide is provided to a seal member for sealing the space between an electrolyte membrane and a separator that sandwiches a membrane-electrode assembly from both sides in order to inhibit deterioration of a seal member for sealing the space between an electrolyte membrane and a separator, an electrolyte membrane, and the like so as to improve durability.

Also, it has been revealed that there is a disadvantage to the use of such a peroxide decomposition catalyst capable of decomposing peroxide in that the initial output decreases as a result of the addition of Ce as a peroxide decomposition catalyst. It is thought that such initial output decrease results from the reduction of proton conductivity due to the ion exchange of some sulfonic acid groups in an electrolyte membrane with Ce ions. For instance, it has been revealed that if the amount of Ce added is increased, the initial output decreases to a greater extent. Therefore, it is considered that it is necessary to reduce the amount of Ce added (or use a poorly soluble compound) or to add Ce only to necessary parts of an electrode.

Patent Document 1: JP Patent Publication (Kokai) No. 2004-288495 A
Patent Document 2: JP Patent Publication (Kohyo) No. 2005-520002 A
Patent Document 3: JP Patent Publication (Kokai) No. 2005-235437 A
Patent Document 4: JP Patent Publication (Kokai) No. 2005-267904 A
Patent Document 5: JP Patent Publication (Kokoku) No. 51-18991 A (1976)
Patent Document 6: JP Patent Publication (Kohyo) No. 2006-504848 A
Patent Document 7: U.S. Pat. No. 5,476,589

DISCLOSURE OF THE INVENTION

Therefore, it is an object of the present invention to provide a fuel cell electrolyte membrane reinforced with a porous substrate, which has excellent durability and in which the amount of cross leakage as a result of chemical deterioration of electrolyte membrane components due to the presence of peroxide and/or radicals is particularly reduced. It is another object of the present invention to provide a fuel cell membrane-electrode assembly having improved durability. Further, it is another object of the present invention to provide a polymer electrolyte fuel cell having high output and excellent durability with the use of the above membrane-electrode assembly. In particular, it is an object of the present invention to provide a polymer electrolyte fuel cell having high output and excellent durability under the high environment temperature and low environment humidity conditions that characterize fuel cell operation conditions.

The present inventors have found that the stability of a perfluorocarbon polymer having sulfonic acid groups that are electrolytes can be improved via reinforcement. The present inventors also have found that fuel cell durability can be significantly improved by adding a group of specific compounds to an electrolyte membrane. In addition, the present inventors obtained a highly durable composite membrane having uniform ion conductivity without complicating the fine porous substrate structure.

Specifically, the present invention encompasses the following inventions.

(1) An electrolyte membrane for a fuel cell comprised of a polyelectrolyte, which contains a porous substrate and a radical scavenger dispersed in the polyelectrolyte.

(2) The electrolyte membrane for a fuel cell according to (1), wherein the porous substrate is a porous membrane composed of a material selected from polytetrafluoroethylene, a polytetrafluoroethylene-chlorotrifluoroethylene copolymer, polychlorotrifluoroethylene, polybromotrifluoroethylene, a polytetrafluoroethylene-bromotrifluoroethylene copolymer, a polytetrafluoroethylene-perfluoro vinyl ether copolymer, and a polytetrafluoroethylene-hexafluoropropylene copolymer, or a combination of two or more of such materials.

(3) The electrolyte membrane for a fuel cell according to (2), wherein the porous substrate is a polytetrafluoroethylene (PTFE) membrane made porous by a stretching method.

(4) The electrolyte membrane for a fuel cell according to any one of (1) to (3), wherein the radical scavenger is at least one selected from the group consisting of $CeO_2$, Ru, Ag, $RuO_2$, $WO_3$, $Fe_3O_4$, $CePO_4$, $CrPO_4$, $AlPO_4$, $FePO_4$, $CeF_3$, $FeF_3$, $Ce_2(CO_3)_3.8H_2O$, $Ce(CHCOO)_3.H_2O$, $CeCl_3.6H_2O$, $Ce(NO_3)_6.6H_2O$, $Ce(NH_4)_2(NO_3)_6$, $Ce(NH_4)_4(SO_4)_4.4H_2O$, $Ce(CH_3COCHCOCH_3)_3.3H_2O$, Fe-porphyrin, and Co-porphyrin.

(5) The electrolyte membrane for a fuel cell according to any one of (1) to (4), wherein the polyelectrolyte is a perfluorocarbon sulfonate resin represented by formula (I):

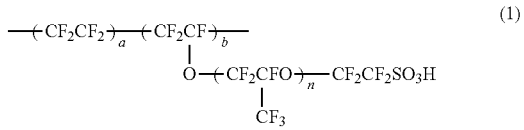

(wherein a: b=1:1 to 9:1 and n=0, 1, or 2).

(6) A fuel cell membrane-electrode assembly, which comprises a pair of electrodes composed of a fuel electrode to which fuel gas is supplied and an oxygen electrode to which an oxidizer gas is supplied and a polymer electrolyte membrane sandwiched between the pair of electrodes, wherein the polymer electrolyte membrane is the electrolyte membrane for a fuel cell according to any of (1) to (5)

(7) A polymer electrolyte fuel cell comprising a membrane-electrode assembly having the electrolyte membrane for a fuel cell according to any one of (1) to (5).

In addition, the present invention also encompasses the following inventions.

[1] A reinforced electrolyte membrane for a fuel cell in which a porous substrate and a dispersion liquid of polyelectrolyte are made into a composite, wherein the electrolyte membrane contains a radical scavenger and wherein the relative elongation value, which is obtained by designating either larger one of the elongation degrees in the machine direction (MD) and in the transverse direction (TD; vertical to the MD direction) at the maximum tensile strength of the electrolyte membrane in the machine direction (MD) and in the transverse direction (TD) as a denominator, is 0.4 to 1.0.

[2] The reinforced electrolyte membrane for a fuel cell according to [1], wherein the maximum tensile strength is 65 N/mm² or more at 23° C. and at a relative humidity of 50% in either one of the machine direction (MD) and the transverse direction (TD) at the time of sheet making.

[3] The reinforced electrolyte membrane for a fuel cell according to [1], wherein the maximum tensile strength is 35 N/mm² or more at 80° C. and at a relative humidity of 90% in either one of the machine direction (MD) and the transverse direction (TD) at the time of sheet making.

[4] The reinforced electrolyte membrane for a fuel cell according to any one of [1] to [3], wherein the porous substrate is a polytetrafluoroethylene (PTFE) membrane made porous by a stretching method.

[5] The reinforced electrolyte membrane for fuel cell according to any one of [1] to [4], wherein the radical scavenger is at least one selected from the group consisting of $CeO_2$, Ru, Ag, $RuO_2$, $WO_3$, $Fe_3O_4$, $CePO_4$, $CrPO_4$, $AlPO_4$, $FePO_4$, $CeF_3$, $FeF_3$, $Ce_2(CO_3)_3.8H_2O$, $Ce(CHCOO)_3.H_2O$, $CeCl_3.6H_2O$, $Ce(NO_3)_6.6H_2O$, $Ce(NH_4)_2(NO_3)_6$, $Ce(NH_4)_4(SO_4)_4.4H_2O$, $Ce(CH_3COCHCOCH_3)_3.3H_2O$, Fe-porphyrin, and Co-porphyrin.

[6] A fuel cell membrane-electrode assembly, which comprises a pair of electrodes composed of a fuel electrode to which fuel gas is supplied and an oxygen electrode to which an oxidizer gas is supplied and a polymer electrolyte membrane sandwiched between the pair of electrodes, wherein the polymer electrolyte membrane is the reinforced electrolyte membrane for fuel cell according to any one of [1] to [5].

[7] A polymer electrolyte fuel cell comprising a membrane-electrode assembly having the reinforced electrolyte membrane for fuel cell according to any one of [1] to [5].

Preferably, the electrolyte membrane for fuel cell of the present invention has a relative elongation value of 0.4 to 1.0, provided that the value is obtained by designating, as a denominator, either larger one of the degree of elongation in the machine direction (MD) and the degree of elongation in the transverse direction (TD; vertical to the MD direction) at the maximum tensile strength of the electrolyte membrane in the machine direction (for sheet processing) (MD) and in the transverse direction (TD; vertical to the MD direction). Preferably, the electrolyte membrane for fuel cell of the present invention has a relative elongation value of 0.4 to 1.0 at 80° C. and at a relative humidity of 90%, provided that the value is obtained by designating, as a denominator, either larger one of the degree of elongation in the machine direction (MD) and the degree of elongation in the transverse direction (TD; vertical to the MD direction) at the maximum tensile strength of the electrolyte membrane in the machine direction (for sheet processing) (MD) and in the transverse direction (TD; vertical to the MD direction).

The reinforced electrolyte membrane for a fuel cell of the present invention is a high-strength reinforced electrolyte membrane for a fuel cell obtained by impregnating a porous substrate with a dispersion liquid of polyelectrolyte, which is excellent in terms of resistance to physical deterioration. Further, the present inventors succeeded in significantly improving durability of such reinforced electrolyte membrane for a fuel cell over conventional electrolyte membranes by allowing a radical scavenger capable of inhibiting chemical deterioration to be uniformly dispersed/contained in a polyelectrolyte.

In the case of the reinforced electrolyte membrane for a fuel cell of the present invention, either the maximum tensile strength in the machine direction (for sheet processing) (MD) or the maximum tensile strength in the transverse direction (TD; vertical to the MD direction) is preferably 65 N/mm² or more at 23° C. and at a relative humidity of 50% and more preferably 70 N/mm² or more at 23° C. and at a relative humidity of 50% As a result of reinforcement with a reinforcing film, the amount of eluted fluorine ions is reduced in the reinforced electrolyte membrane for fuel cell of the present invention. Therefore, the membrane exhibits excellent durability.

In the case of the reinforced electrolyte membrane for a fuel cell of the present invention, either the maximum tensile strength in the machine direction (for sheet processing) (MD) or the maximum tensile strength in the transverse direction (TD; vertical to the MD direction) is preferably 35 N/mm² or more at 80° C. and at a relative humidity of 90% and more preferably 40 N/mm² or more at 80° C. and at a relative humidity of 90%. As a result of reinforcement with a reinforcing film, the amount of eluted fluorine ions is reduced in the reinforced electrolyte membrane for fuel cell of the present invention. Therefore, the membrane exhibits excellent durability.

As the above porous substrate, a widely known reinforcing membrane for a fuel cell can be used. For example, a porous substrate composed of a fluorine resin having excellent strength and shape stability or a combination of at least two types of such fluorine resins can be preferably used. Examples of such fluorine resin include polytetrafluoroethylene, a polytetrafluoroethylene-chlorotrifluoroethylene copolymer, polychlorotrifluoroethylene, polybromotrifluoroethylene, a polytetrafluoroethylene-bromotrifluoroethylene copolymer, a polytetrafluoroethylene-perfluoro vinyl ether copolymer, and a polytetrafluoroethylene-hexafluoropropylene copolymer. The degree of polymerization and the molecular weight of such fluorine resin are not particularly limited. However, in view of strength, shape stability, and the like, the weight average molecular weight of a fluorine resin is preferably approximately 10,000 to 10,000,000. Among the examples, a polytetrafluoroethylene (PTFE) membrane made porous by a stretching method is preferable For example, a radical scavenger contained in the reinforced electrolyte membrane for a fuel cell of the present invention is at least one member selected from the group consisting of $CeO_2$, Ru, Ag, $RuO_2$, $WO_3$, $Fe_3O_4$, $CePO_4$, $CrPO_4$, $AlPO_4$, $FePO_4$, $CeF_3$, $FeF_3$, $Ce_2(CO_3)_3 \cdot 8H_2O$, $Ce(CHCOO)_3 \cdot H_2O$, $CeCl_3 \cdot 6H_2O$, $Ce(NO_3)_6 \cdot 6H_2O$, $Ce(NH_4)_2(NO_3)_6$, $Ce(NH_4)_4(SO_4)_4 \cdot 4H_2O$, $Ce(CH_3COCHCOCH_3)_3 \cdot 3H_2O$, Fe-porphyrin, and Co-porphyrin. Of these, cerium oxide is particularly preferable.

In addition, the present invention encompasses a fuel cell membrane-electrode assembly, which comprises a pair of electrodes composed of a fuel electrode to which fuel gas is supplied and an oxygen electrode to which an oxidizer gas is supplied and a polymer electrolyte membrane sandwiched between the pair of electrodes, wherein the polymer electrolyte membrane is the above reinforced electrolyte membrane for a fuel cell.

In addition, the present invention encompasses a polymer electrolyte fuel cell comprising a membrane-electrode assembly having the above reinforced electrolyte membrane for a fuel cell.

As a result of reinforcement with a reinforcing membrane, the amount of eluted fluorine ions is reduced in the reinforced electrolyte membrane for fuel cell of the present invention. Therefore, the membrane exhibits excellent durability.

In addition, according to the present invention, harmful peroxide, radicals, and the like generated during operation of the fuel cell can be removed from an electrolyte membrane. Therefore, a fuel cell having improved durability can be obtained by preventing deterioration of an electrolyte membrane and an electrolyte in an electrode catalyst layer caused by peroxide, radicals, and the like.

Figure 1:
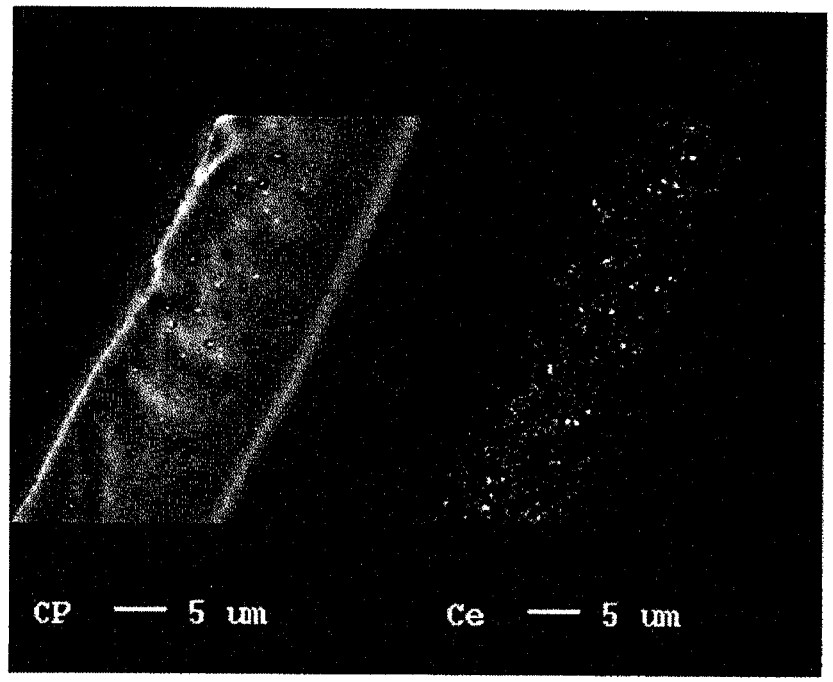
FIG. 1 shows results obtained by confirming the state of $CeO_2$ dispersed in a membrane section of the composite membrane of the Example with an electron probe microanalyzer (EPMA).

This description includes part or all of the contents as disclosed in the description and/or drawings of Japanese Patent Application No. 2008-269094, which is a priority document of the present application.

BEST MODE FOR CARRYING OUT THE INVENTION

The reinforced electrolyte membrane for a fuel cell of the present invention, the method for producing the same, and the functions of the same are described below.

The reinforced electrolyte membrane for fuel cell of the present invention is a composite membrane composed of a reinforced electrolyte membrane comprising perfluorocarbon having sulfonic acid groups, and it does not necessarily have a conventional specific internal fine structure (e.g., a structure with a large aspect ratio for a reinforced membrane portion having nodes bound to each other via fibrils) to achieve high strength. Also, the reinforced electrolyte membrane for a fuel cell of the present invention is a composite membrane obtained by changing reinforcement strength so as to improve Fenton's test resistance, which is a measure of the chemical stability of a perfluorocarbon polymer having sulfonic acid groups. When either the maximum tensile strength in the longitudinal direction or that in the lateral direction inside the membrane face is 65 N/mm$^2$ or more at ordinary temperature (23° C.; relative humidity: 50%) or 35 N/mm$^2$ or more at a high temperature at a high humidity (80° C.; relative humidity: 90%) for the composite membrane, the amount of eluted fluorine ions found at 80° C. via Fenton's test can be reduced by 14% to 69%, compared with conventional membranes. Further, an electrode assembly obtained by making a catalyst layer by a general method has high durability without a decrease in the initial performance of a single fuel cell.

A porous substrate used in the present invention can function as a carrier for supporting a polyelectrolyte on the surface thereof (specifically, on the internal pore surfaces). For example, a porous substrate composed of a fluorine resin having excellent strength and shape stability can be preferably used. Examples of such fluorine resin include polytetrafluoroethylene, a polytetrafluoroethylene-chlorotrifluoroethylene copolymer, polychlorotrifluoroethylene, polybromotrifluoroethylene, a polytetra-fluoroethylene-bromotrifluoroethylene copolymer, a polytetrafluoroethylene-perfluoro vinyl ether copolymer, and a polytetrafluoroethylene-hexafluoropropylene copolymer. The degree of polymerization and the molecular weight of such fluorine resin are not particularly limited. However, in view of strength, shape stability, and the like, the weight average molecular weight of a fluorine resin is preferably approximately 10,000 to 10,000,000.

Also, the average pore size and the porosity of a porous substrate used in the present invention are not particularly limited. However, the average pore size is preferably approximately 0.001 μm to 100 μm and the porosity is preferably approximately 10% to 99%. If the average pore size is less than 0.001 μm, introduction of a polyelectrolyte into pores tends to be inhibited. On the other hand, if it exceeds 100 μm, proton conductivity tends to decrease due to the insufficient surface area of the porous substrate supporting a polyelectrolyte. In addition, if the porosity is less than 10%, the amount of polyelectrolyte supported in pores becomes insufficient and thus proton conductivity tends to decrease. On the other hand, if it exceeds 99%, the strength and the shape stability of the porous substrate tends to decrease.

The shape of a porous substrate used in the present invention is not particularly limited. However, a porous substrate is preferably in a film or membrane form such that the obtained composite electrolyte can be directly used in the form of a fuel cell electrolyte membrane. In such case, the thickness of a porous substrate in a film or membrane form is not particularly limited. However, the thickness is preferably approximately 1 to 50 µm. If the porous substrate thickness falls below the above lower limit, the strength of the obtained electrolyte membrane tends to decrease. On the other hand, if the thickness exceeds the upper limit, the membrane resistance of the obtained electrolyte membrane increases. Accordingly, the proton conductivity tends to decrease.

Examples of a porous substrate used for the reinforced electrolyte membrane for a fuel cell of the present invention and a method for producing the same are disclosed in Patent Document 5. Patent Document 5 discloses a method for producing a porous polymer membrane comprising polytetrafluoroethylene, comprising the steps of:

(a) extruding a polytetrafluoroethylene forming product having a degree of crystallinity of approximately 95% or more by a paste extrusion forming method;

(b) removing a liquid lubricant from the forming product by drying the forming product at a temperature higher than the evaporation temperature of the liquid lubricant and lower than the crystalline melting point of polytetrafluoroethylene; and (c) carrying out a stretching operation at a stretching rate per unit time of more than 10%/second at a temperature lower than the crystalline melting point of polytetrafluoroethylene upon stretching of the forming product at an increased temperature lower than the crystalline melting point of polytetrafluoroethylene in at least one direction in a manner such that the matrix tensile strength of the stretched forming product is adjusted to 514 kg/cm$^2$ or more.

Similarly, Patent Document 6 discloses a porous substrate used for the reinforced electrolyte membrane for a fuel cell of the present invention and a method for producing the same. Specifically, Patent Document 6 discloses a composite composed of a porous polymer membrane, provided that pores of the membrane are at least partially filled with a resin, that the bending elastic modulus of the resin (at room temperature) is approximately more than 1 GPa, and that the membrane satisfies the following condition: 75 MPa<(the longitudinal membrane tensile elasticity rate+the lateral membrane tensile elasticity rate)/2. Also, the document discloses that stretched polytetrafluoroethylene substantially contains no nodal material in a case in which a porous polymer membrane is made of stretched polytetrafluoroethylene.

More specifically, Patent Document 6 describes as follows: It has been unexpectedly discovered that when used in a composite structure, porous polymer membrane structures according to the invention contribute significantly to the fracture toughness of the composite. In an aspect of the invention, the membrane structure is an stretched polytetrafluoroethylene membrane that has minimal material present in non-fibrillar form, termed "nodes." In a further aspect of the invention, the membrane is substantially void of nodal material. Isotropic fibril orientation is preferred when stress may be loaded from multiple directions. When stress is anisotropic it is preferred that the greater number of fibrils be parallel to the direction of maximum stress. When multiple layer structures are contemplated, cross plying of the layers may be desirable to maximize performance. One measure of fibril orientation and density is the membrane tensile modulus. Membranes having higher moduli are preferred. Unlike traditional high modulus fiber reinforcements (e.g., glass, carbon, etc.), the membranes of this invention have substantially non-linear, membrane-like structures. In the specific case of stretched polytetrafluoroethylene membranes, the membrane does not readily wet or bond to other materials. Membranes comprising polymer materials are preferred. Membranes comprising stretched polymers are preferred. Membranes comprising stretched PTFE are the most preferred. The polymer membrane may comprise virtually any polymer material, for example, vinyl polymers, styrene, acrylate, methacrylate, polyethylenes, polypropylenes, polyacrylonitrile, polyacrylamide, polyvinyl chloride, fluoropolymers including PTFE, condensation polymers, polysulfones, polyimides, polyamides, polycarbonates, polysulfides, polyesters, polyanhydrides, polyacetals, polyurethanes, polyurea, cellulose, cellulose derivatives, polysaccharides, pectinic polymers and derivatives, alginic polymers and derivatives, chitin and derivatives, phenolics, aldehyde polymers, polysiloxanes, derivatives, copolymers and blends thereof. The porous polymer membrane film may be made by known methods. Preferred are ePTFE membranes having minimal nodal material. Most preferred are node-free ePTFE membranes. Such ePTFE membranes can be made, for example, according to the teachings of U.S. Pat. No. 5,476,589 (Patent Document 7). Such membranes are formed through biaxial stretching of PTFE so as to create a membrane that is highly fibrillated-essentially eliminating coarse nodal structure. As a result, the structure comprises an extremely strong web of fine fibrils intersectnig at fibril cross-over points. Representative of such structures can be seen in the S.E.M. Large node structures are absent from such membrane films.

The stretched PTFE material according to Patent Document 7 can be produced as described below. A PTFE fine powder with a low amorphous content and a degree of crystallinity of at least 98% is used as a starting material. Preferred examples of a PTFE fine powder include FLUON® CD-123 and FLUON® CD-1 fine powders (ICI Americans) and a TEFLON® fine powder (E. I. duPont de Nemours). First, a PTFE fine powder is coagulated and then lubricated with a hydrocarbon extrusion aid, and preferably with an odorless mineral spirit such as ISOPAR® K (Exxon). The lubricated powder is compressed into a cylindrical form, followed by extrusion with a ram extruder. Thus, tape is formed. Two or more layers of the tape are laminated together and compressed between two rolls. The tape or tapes are compressed between rolls so as to result in an appropriate thickness of, for example, 0.1 to 1 mm. The wet tape is stretched in the lateral direction so as to result in a width 1.5 to 5 times the initial width. The tape is heated for the removal of the extrusion aid. Next, the dried tape is stretched in the longitudinal direction in a space between banks of rolls heated to a temperature below the melting point of a polymer (327° C.). For stretching in the longitudinal direction, the ratio of speed of the second bank of rolls to the first bank is designated as 10 to 100:1. Stretching in the longitudinal direction is repeated at a ratio of the same of 1 to 1.5:1. Next, the tape stretched in the longitudinal direction is further stretched in the lateral direction at a temperature below 327° C. so as to result in a width at least 1.5 times and preferably 6 to 15 times the input width of the initial extruded product in a manner such that the membrane is not allowed to contract in the longitudinal direction. While still under constraint the membrane is preferably heated to a temperature that is preferably higher than the melting point of a polymer (327° C.), followed by cooling. A particularly preferred membrane is an ePTFE membrane containing high-density fibrils oriented in a desired maximum stress direction in a composite body of interest, which is void of nodes. Isotropic fibril orientation is preferred when stress may be applied from multiple directions. Such an ePTFE membrane is allowed to have a preferable void rate. In one embodiment of the present invention, the membrane void rate is approximately 1 vol % to 99.5 vol %. In another embodiment of the present invention, the void rate can be approximately 50% to 90%. A preferred void rate is approximately 70% to 90%. A membrane may be treated according to need so as to facilitate adhesion to a resin component. For example, treatment involving corona, plasma, or chemical oxidation can be carried out. In order to form the composite of the present invention, it is necessary to allow pores of the membrane at least to partially absorb a resin. A polymer resin is preferable. Examples thereof include a thermoplastic resin, a thermosetting resin, and a mixture composed of a combination thereof. In one embodiment of the present invention, a resin is a polymer with a glass transition temperature of an amorphous component of >80° C.

A widely known polyelectrolyte can be used for the electrolyte membrane for a fuel cell of the present invention. A preferable example is a polyelectrolyte having ion-exchange capacity represented by general formula (I) given below (wherein a:b=1:1 to 9:1 and n=0, 1, or 2):

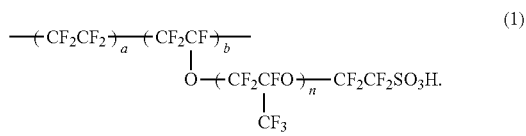

(1)

A porous substrate is impregnated or coated with liquid obtained by dispersing or dissolving a polyelectrolyte in a solvent. The reinforced electrolyte membrane for a fuel cell of the present invention can be obtained by removing the solvent therefrom via evaporation or the like. Examples of a solvent in which a polyelectrolyte is dispersed or dissolved include water; linear, branched, or cyclic $C_{4-8}$ alcohols such as methanol, ethanol, n-propanol, isopropanol, n-butylalcohol, isobutylalcohol, sec-butylalcohol, tert-butylalcohol, propylene glycol, 1-pentanol, 2-pentanol, 3-pentanol, 2-methyl-1-butanol, 3-methyl-1-butanol, 1-hexanol, 2-hexanol, 3-hexanol, 2-methyl-1-pentanol, 3-methyl-1-pentanol, and 4-methyl-1-pentanol (and particularly preferably ethanol and 1-propanol); hydrocarbon solvents such as n-hexane; ether-type solvents such as tetrahydrofuran and dioxane; sulfoxide-type solvents such as dimethylsulfoxide and diethylsulfoxide; formamide-type solvents such as N,N-dimethylformamide and N,N-diethylformamide; acetamide-type solvents such as N,N-dimethylacetamide and N,N-diethylacetamide; pyrrolidone-type solvents such as N-methyl-2-pyrrolidone and N-vinyl-2-pyrrolidone; 1,1,2,2-tetrachloroethane, 1,1,1,2-tetrachloroethane; 1,1,1-trichloroethane; 1,2-dichloroethane; trichloroethylene; tetrachloroethylene; dichloromethane; and chloroform. Water and the solvents described above can be used alone or in combinations of two or more.

As a electrolyte in the membrane-electrode assembly of the present invention, a plurality of reinforcing porous substrates may be laminated. In such case, at least one of the plurality of porous substrates is the reinforced electrolyte membrane of the present invention. The type of electrolyte membrane to be laminated is not particularly limited as long as it is a polymer membrane that can be used as an electrolyte. In addition, electrolyte membranes to be laminated may be of the same type. Alternatively, different types of electrolyte membranes may be used in combination. For instance, a liquid obtained by dispersing or dissolving any of the following examples in a solvent can be used: perfluorinated electrolyte membranes such as a perfluorinated sulfonic acid membrane, a perfluorinated phosphonic acid membrane, a perfluorinated carboxylic acid membrane, and a PTFE composite membrane composed of any one of the above perfluorinated membranes comprising a polytetrafluoroethylene (PTFE) composite; and hydrocarbon-type electrolyte membranes such as a fluorine-containing hydrocarbon-type graft membrane, a wholly hydrocarbon-type graft membrane, and a wholly aromatic membrane.

The polymer electrolyte fuel cell of the present invention is a polymer electrolyte fuel cell comprising the aforementioned fuel cell membrane-electrode assembly of the present invention. In addition to the use of the fuel cell membrane-electrode assembly of the present invention, it is possible to conform to the configuration of a widely known polymer electrolyte fuel cell. With the use of the fuel cell membrane-electrode assembly of the present invention, the polymer electrolyte fuel cell of the present invention, which is a high-output polymer electrolyte fuel cell having excellent durability, can be obtained at a low cost.

EXAMPLES

The Example and the Comparative Examples of the present invention are described below.

Porous substrates used for the Example and the Comparative Examples were prepared by subjecting PTFE tape to biaxial stretching for advanced fibrillation in accordance with the method described below.

An extrusion aid (IsoperK, Exxon) was added to a PTFE fine powder (PTFE601A, Dupont) so as to result in a content of 285 mg of the aid per 1 kg of the PTFE fine powder. The PTFE fine powder to which the extrusion aid had been added was compressed so as to be formed into a cylindrical shape. The resultant was extruded with a ram extruder such that tape was formed. The extruded tape was rolled by mill rolls to a thickness of approximately 20 μm. The extrusion aid was removed from the rolled tape with the use of a fan oven at 210° C.

Next, the temperature was adjusted to a stretching temperature in the length direction listed in table 1 below. Stretching between banks of rolls in a heating zone was carried out in the length direction. Then, stretching in the lateral direction was carried out in a manner such that the membrane was not allowed to contract in the longitudinal direction in a heating zone in which the temperature was adjusted to a stretching temperature in the lateral direction as listed in table 1 below. Thereafter, heat treatment was performed at 380° C. while the membrane was fixed so as not to contract. Thus, a porous substrate was obtained.

Porous substrates used for Comparative Example 4 and the Example were obtained by changing the stretching speed and the stretching ratio to be applied. The porous substrate used in Comparative Example 4 is the same as that used in the Example. In addition, the porous substrates to be used in Comparative Examples 1 to 3 were obtained under the following conditions.

TABLE 1

| Sample | Stretching temperature (° C.) Length direction | Stretching temperature (° C.) Width direction | Stretching speed (%/sec) Length direction | Stretching speed (%/sec) Width direction | Stretching ratio Length direction | Stretching ratio Width direction |
|---|---|---|---|---|---|---|
| Example | 354 | 350 | 50 | 90 | 7.5 | 22.5 |
| Comparative Example 1 | 350 | 350 | 32 | 55 | 5.0 | 15.0 |
| Comparative Example 2 | 351 | 350 | 44 | 65 | 6.8 | 14.2 |
| Comparative Example 3 | 354 | 350 | 50 | 90 | 7.5 | 22.5 |

Example

The prepared porous substrate was impregnated with a liquid obtained by dispersing $CeO_2$ powder (Kojundo Chemical Lab Co., Ltd.; product name: "CEO05PB"; average particle size: 0.2 μm), which had been previously weighed to adjust the content thereof in a membrane to 7 μg/cm$^2$, in a liquid mixture of a perfluoro carbon sulfonate resin (Nafion solution (DE2020))/alcohol solvent (ethanol or 1-propanol) and water (referred to as a "dispersion liquid of polyelectrolyte").

The porous substrate was fixed in a fixation frame so as not to contract. The above dispersion liquid of polyelectrolyte containing a $CeO_2$ powder was applied to both sides of each porous substrate, followed by drying with a hair dryer for removal of the solvent. The porous substrate and the fixation frame were dried in an oven at 180° C. for 8 minutes. Each porous substrate with the corresponding fixation frame was removed from the oven. The porous substrate was separated from the fixation frame.

The thus removed porous substrate/polyelectrolyte composite membrane was transparent. Therefore, the complete impregnation of the porous substrate with polyelectrolyte was confirmed. The thickness of the obtained composite membrane was found to be approximately 20 μm. As a result of quantification of the Ce-content in the membrane by inductively coupled plasma mass spectrometer (ICP-MS), the content was found to be approximately 7 μg/cm$^2$.

Comparative Examples 1 to 4

For comparison, a porous substrate/polyelectrolyte composite membrane was prepared as in the Example, except that a dispersion liquid of polyelectrolyte containing no $CeO_2$ powder was used. The thickness of the obtained composite membrane was found to be approximately 45 μm in Comparative Examples 1 to 3 and approximately 20 μm in Comparative Example 4.

Table 2 shows the results of the tensile test under ordinary temperature conditions, the results of the tensile test under high temperature and high humidity conditions, and ion conductivity for the composite membranes obtained in the Example and Comparative Example 4. Each test was performed according to the corresponding procedure described below.

[Maximum Tensile Strength, Degree of Elongation, and Elastic Modulus]

Tensile strength was measured with a tensile tester under ordinary temperature conditions (environmental temperature and humidity: 23° C., 50% RH) or high temperature and high humidity conditions (environmental temperature and humidity: 80° C., 90% RH) (initial inter-chuck distance: 80 mm; test piece shape: rectangle with a width of 10 mm; and tensile rate: 200 mm/min). The strength and the degree of elongation at the maximum tensile strength were determined. In addition, the elastic modulus at a degree of elongation of 2% was used.

[Ion Conductivity]

Each test piece 10 mm in width was attached to a jig equipped with platinum electrodes placed at 5-mm intervals. Each jig to which a test piece had been attached was immersed in distilled water at 30±0.5° C. for 1 hour. Then, impedance was measured with an LCR meter at a measurement frequency of 100 kHz. Subsequently, proton conductivity was calculated using the following equation.

$$\kappa(S/cm) = 1/\text{impedance}(\Omega) \times \text{inter-terminal distance (cm)}/\text{sample cross-sectional area (cm}^2)$$

TABLE 2

| | | | Example | Comparative Example 4 |
|---|---|---|---|---|
| Ordinary temperature conditions (23° C., 50% RH) | Thickness (μm) | | 20 | 20 |
| | Maximum strength (N/mm$^2$) | MD | 64.8 | 61.5 |
| | | TD | 67.4 | 67.0 |
| | Degree of elongation at the maximum strength (%) | MD | 33 | 32 |
| | | TD | 88 | 84 |
| | Relative elongation value | MD/TD | 0.38 | 0.38 |
| High temperature conditions (80° C., 90% RH) | Maximum strength (N/mm$^2$) | MD | 36.9 | 34.4 |
| | | TD | 41.3 | 32.3 |
| | Degree of elongation at the maximum strength (%) | MD | 65 | 61 |
| | | TD | 95 | 109 |
| | Relative elongation value | MD/TD | 0.68 | 0.56 |
| Ion conductivity (S/cm) | | | 0.29 | 0.29 |

Tables 3 to 5 show the results of the tensile test under ordinary temperature conditions, the results of the tensile test under high temperature and high humidity conditions, and ion conductivity for the composite membranes obtained in Comparative Examples 1 to 3.

TABLE 3

Ordinary temperature conditions (23° C., 50% RH)

Maximum tensile strength (N/mm$^2$)

| Sample | Machine direction (MD) | Transverse direction (TD; vertical to the MD direction) |
|---|---|---|
| Comparative Example 1 | 65.2 | 76.9 |
| Comparative Example 2 | 82.6 | 82.5 |
| Comparative Example 3 | 85.5 | 93.7 |

TABLE 4

High temperature and high humidigy conditions (80° C., 90% RH)

Maximum tensile strength (N/mm$^2$)

| Sample | Machine direction (MD) | Transverse direction (TD; vertical to the MD direction) |
|---|---|---|
| Comparative Example 1 | 36.0 | 47.0 |

TABLE 4-continued

High temperature and high humidigy conditions (80° C., 90% RH)

| | Maximum tensile strength (N/mm²) | |
|---|---|---|
| Sample | Machine direction (MD) | Transverse direction (TD; vertical to the MD direction) |
| Comparative Example 2 | 49.0 | 50.0 |
| Comparative Example 3 | 50.0 | 58.0 |

TABLE 5

| Sample | Ion conductivity [S/cm] |
|---|---|
| Comparative Example 1 | 0.14 |
| Comparative Example 2 | 0.16 |
| Comparative Example 3 | 0.15 |

Table 6 summarizes the results obtained in the Example and Comparative Examples 1 to 4 listed in tables 2 to 5.

TABLE 6

| | | | Example | Comparative Example 1 | Comparative Example 2 | Comparative Example 3 | Comparative Example 4 |
|---|---|---|---|---|---|---|---|
| | | | 20 | 45 | 45 | 45 | 20 |
| Odinary temperature conditions (23° C., 50% RH) | Maximum strength (N/mm²) | MD | 64.8 | 65.2 | 82.6 | 85.5 | 61.5 |
| | | TD | 67.4 | 76.9 | 82.5 | 93.7 | 67.0 |
| | Degree of elongation at the maximum strength (%) | MD | 33 | — | — | — | 32 |
| | | TD | 88 | — | — | — | 84 |
| | Relative elongation value | MD/TD | 0.38 | 0.44 | 0.53 | 0.66 | 0.38 |
| High temperature conditions (80° C., 90% RH) | Maximum strength (N/mm²) | MD | 36.9 | 36.0 | 49.0 | 50.0 | 34.4 |
| | | TD | 41.3 | 47.0 | 50.0 | 58.0 | 32.3 |
| | Degree of elongation at the maximum strength (%) | MD | 65 | — | — | — | 61 |
| | | TD | 95 | — | — | — | 109 |
| | Relative elongation value | MD/TD | 0.68 | 0.49 | 0.47 | 0.63 | 0.56 |
| Ion conductivity (S/cm) | | | 0.29 | 0.14 | 0.16 | 0.15 | 0.29 |

Figure 2:
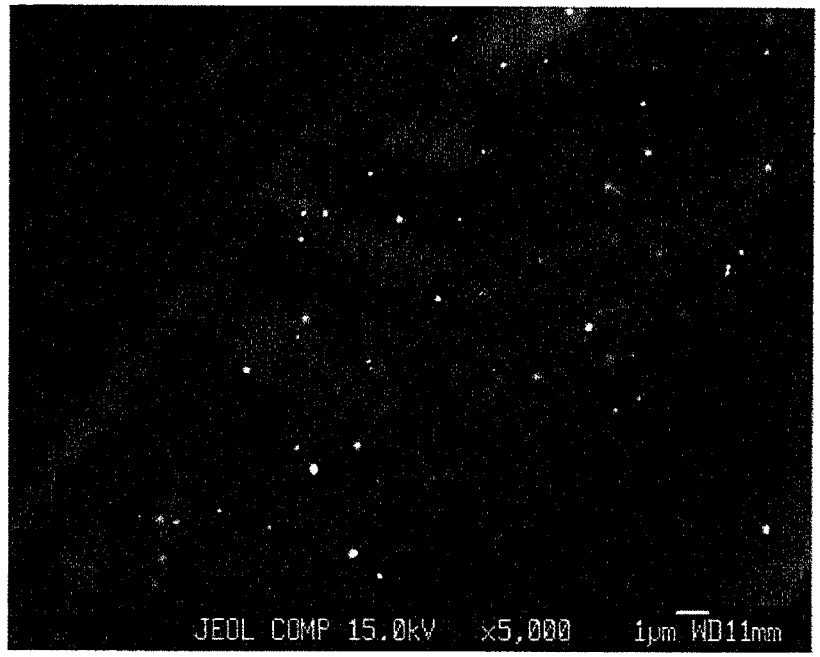
FIG. 2 shows results obtained by confirming the state of $CeO_2$ dispersed in a membrane section of the composite membrane of the Example with a scanning electron microscope (SEM).

FIG. 1 shows results obtained by confirming the state of $CeO_2$ dispersed in a membrane section of the composite membrane of the Example with an electron probe microanalyzer (EPMA). FIG. 2 shows results obtained by confirming the state of $CeO_2$ dispersed in a membrane section of the composite membrane of the Example with a scanning electron microscope (SEM). As a result of observation of each membrane section, uniform dispersion of fine $CeO_2$ particles (appearing as white spots in each figure) was confirmed. The particle size was approximately 0.2 μm or less.

Next, the reinforced electrolyte membranes for fuel cells of the Example and the Comparative Examples 1 to 4 were examined in terms of fuel cell power generation performance.

Fuel cells were produced by a general method with the use of each obtained composite membrane for evaluation of initial performance and durability. The initial voltage was evaluated in the manner described below. The operation temperature was set to 80° C. The hydrogen bubbler temperature and the air bubbler temperature were set to 50° C. Hydrogen was supplied as a fuel gas to a fuel electrode with a stoichiometric ratio of 2.0:1 at a back pressure of approximately 0.1 MPa. Air was supplied as an oxidizer gas to an oxygen electrode with a stoichiometric ratio of 2.5:1 at a back pressure of approximately 0.1 MPa. Electrical discharge was performed with a load of 0.84 A/cm². The voltage value obtained 20 minutes after electrical discharge was designated as the initial voltage. Further, the endurance time was designated as corresponding to the duration of increase in the amount of hydrogen cross-leakage, which was found to be 0.01 Mpa or greater in terms of pressure difference, from the anode to cathode as a result of membrane deterioration caused by repetition of on-off switching in the above environment.

Figure 3:
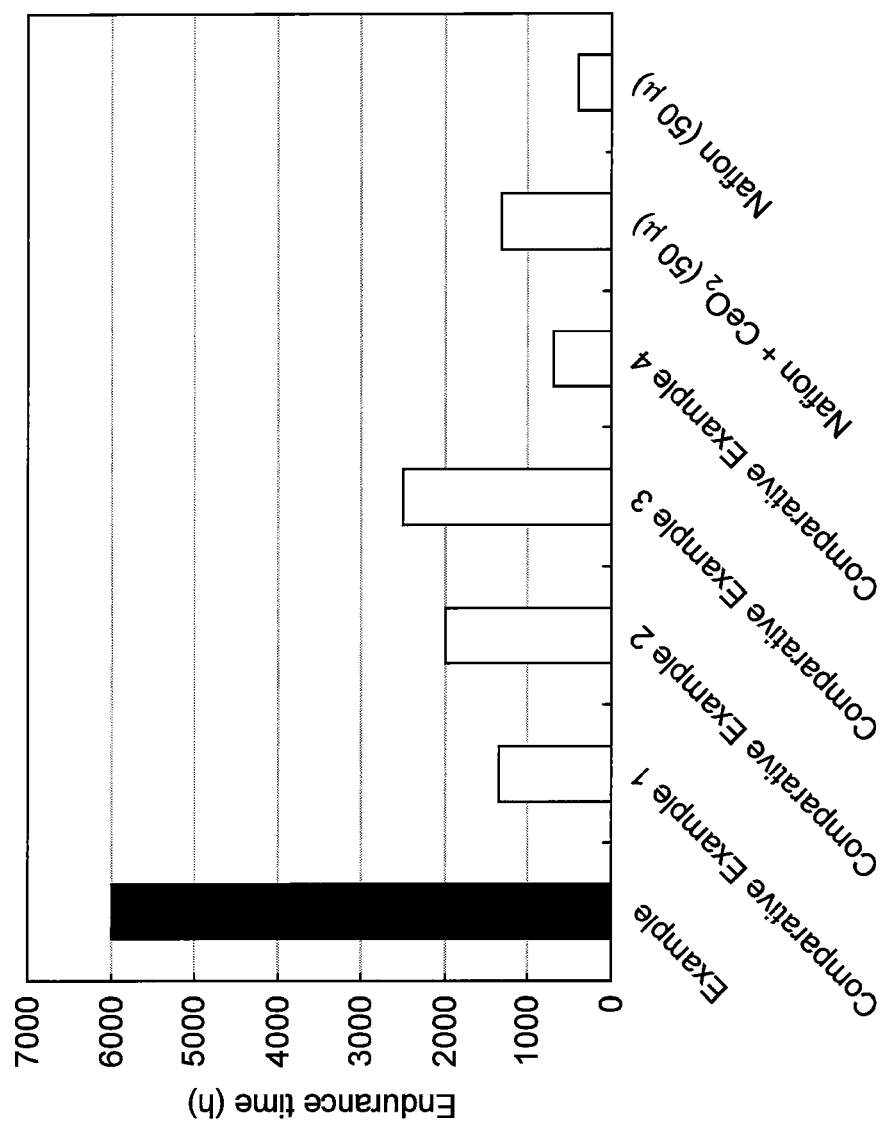
FIG. 3 shows endurance time results for fuel cells using the reinforced electrolyte membranes for fuel cells obtained in the Example and Comparative Examples 1 to 4.

FIG. 3 shows endurance time results for fuel cells using the composite membranes obtained in the Example and Comparative Examples 1 to 4. As a result of FIG. 3, it was found that the membrane supplemented with $CeO_2$ (Example) did not experience an increase of hydrogen cross leakage from the anode to the cathode even after the elapse of a maximum test time period of 6000 hours. The durability of the membrane was improved at least 2.4 to 8.5 times over the membranes containing no $CeO_2$ (Comparative Examples 1 to 4).

In addition, for further comparison, a fuel cell composed of an electrolyte membrane produced with Nafion 112 (thickness: 50 μm) and a fuel cell composed of an electrolyte membrane produced with Nafion 112 supplemented with $CeO_2$ (thickness: 50 μm) were prepared and subjected to the endurance test described above. FIG. 3 shows the test results. These results show that fuel cell durability can be improved with the addition of $CeO_2$ even in the case of an electrolyte membrane that is not reinforced with a porous substrate. However, based on a comparison of these results and the results obtained in the Example and Comparative Example 4, it is understood that the addition of $CeO_2$ resulted in unpredictable improvement of fuel cell durability in the case of the electrolyte membrane reinforced with a porous substrate.

Figure 4:
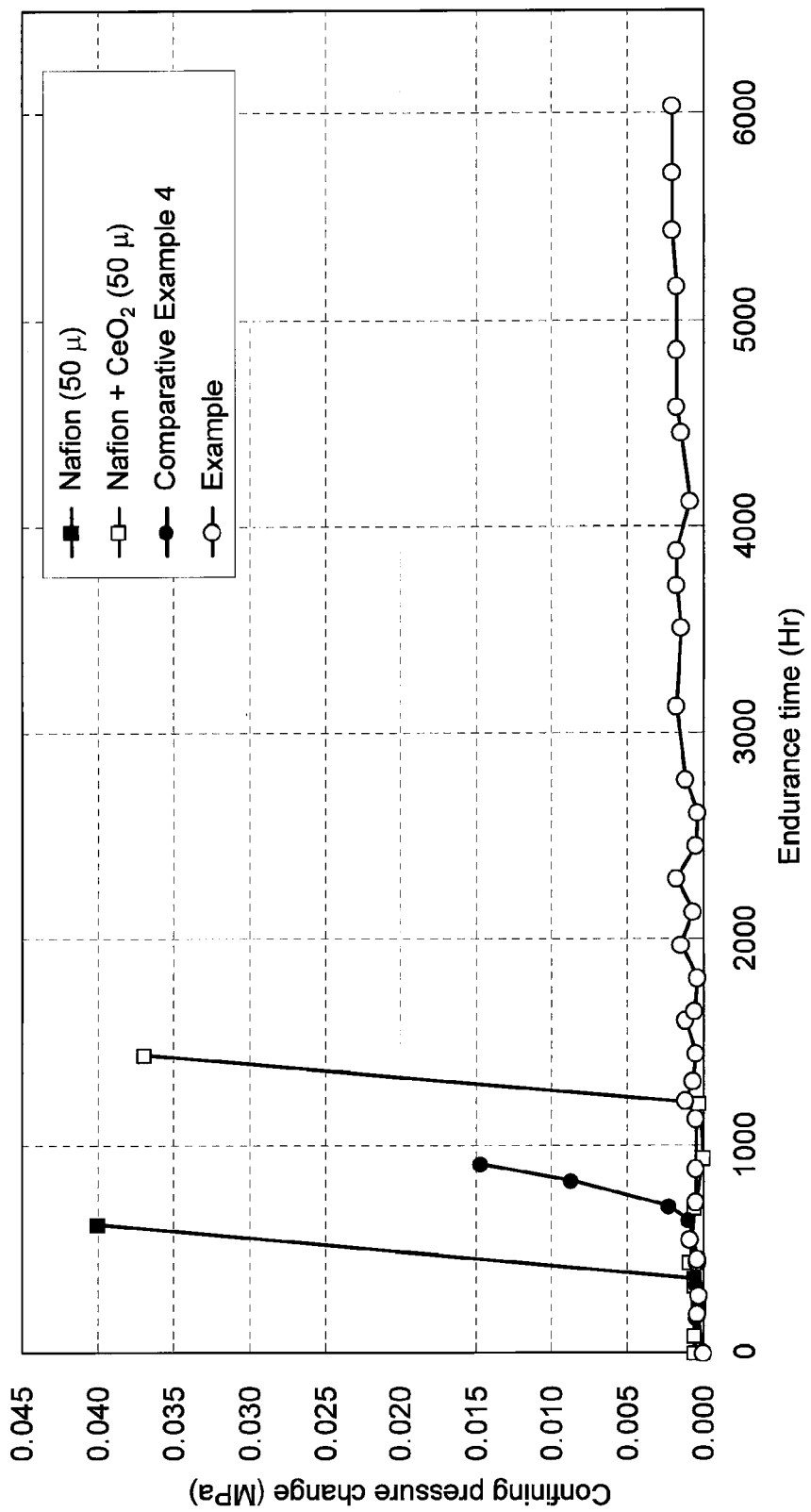
FIG. 4 shows the relationship between the endurance time and the confining pressure change in an electrolyte membrane for fuel cells comprising the electrolyte membrane obtained in the Example, the electrolyte membrane obtained in Comparative Example 4, the electrolyte membrane comprising Nafion 112 (thickness: 50 μm), and the electrolyte membrane comprising Nafion 112 (thickness: 50 μm) supplemented with $CeO_2$.

FIG. 4 shows the relationship between the endurance time and the confining pressure change in an electrolyte membrane for fuel cells comprising the electrolyte membrane obtained in the Example, the electrolyte membrane obtained in Comparative Example 4, the electrolyte membrane comprising Nafion 112 (thickness: 50 μm), and the electrolyte membrane comprising Nafion 112 (thickness: 50 μm) supplemented with $CeO_2$. The results shown in FIG. 4 revealed that the electrolyte membranes other than the electrolyte membrane of the Example started to deteriorate in the early phase, resulting in a sharp increase in cross leakage. On the other hand, the electrolyte membrane of the present invention did not deteriorate even after the elapse of a maximum test time period of 6000 hours, allowing the maintenance of the initial confining pressure change at a low level.

There is a strong correlation between the endurance time of the reinforced electrolyte membrane for a fuel cell and the relative elongation value thereof. Specifically, the reinforced electrolyte membrane for a fuel cell has excellent durability at a relative elongation value of 0.4 to 1.0. In addition, as in the case of an electrolyte membrane used under ordinary temperature conditions, for an electrolyte membrane used under high temperature and high humidity conditions, long endurance time can be achieved if the degree of elongation is 0.4 or more, provided that the degree of elongation is obtained by designating, as a denominator, either larger one of the maximum tensile strength in the machine direction (for sheet processing) (MD) and the maximum tensile strength in the transverse direction (TD; vertical to the MD direction).

INDUSTRIAL APPLICABILITY

The fuel cell electrolyte membrane for a fuel cell of the present invention does not experience cross leakage even after the elapse of an operation time period of 6000 hours, and thus it has significantly improved durability. Therefore, improved durability can be imparted to a fuel cell composed of the same. This contributes to the practical use of fuel cells.

All publications, patents, and patent applications cited herein are incorporated herein by reference in their entirety.

The invention claimed is:

1. A reinforced electrolyte membrane for a fuel cell in which a porous substrate and a dispersion liquid of polyelectrolyte are made into a composite, wherein:
   the electrolyte membrane is obtained by impregnating a porous substrate with a dispersion liquid of polyelectrolyte containing a radical scavenger, wherein the porous substrate is a polytetrafluoroethylene (PTFE) membrane made porous by a stretching method;
   the electrolyte membrane contains a radical scavenger;
   a maximum tensile strength of the electrolyte membrane is 35 N/mm$^2$ or more at 80° C. and at a relative humidity of 90% in either one of the machine direction (MD) and the transverse direction (TD; vertical to the MD direction) at the time of sheet making; and
   a relative elongation value, which is obtained by designating either larger one of the elongation degrees in the machine direction (MD) and in the transverse direction (TD) at the maximum tensile strength of the electrolyte membrane in the machine direction (MD) and in the transverse direction (TD) as a denominator, is 0.4 to 1.0 at 80° C. at a relative humidity of 90%.

2. The electrolyte membrane for a fuel cell according to claim 1, wherein:
   the maximum tensile strength is 36.9 N/mm$^2$ or more at 80° C. at a relative humidity of 90% in either one of the machine direction (MD) and the transverse direction (TD; vertical to the MD direction) at the time of sheet making; and
   the relative elongation value, which is obtained by designating either larger one of the elongation degrees in the machine direction (MD) and in the transverse direction (TD) at the maximum tensile strength of the electrolyte membrane in the machine direction (MD) and in the transverse direction (TD) as a denominator, is 0.68 to 1.0 at 80° C. at a relative humidity of 90%.

3. The electrolyte membrane for a fuel cell according to claim 1, wherein the content of radical scavenger in the electrolyte membrane is 7 μg/cm$^2$ or more.

4. The electrolyte membrane for a fuel cell according to claim 2, wherein the content of radical scavenger in the electrolyte membrane is 7 μg/cm$^2$ or more.

5. The electrolyte membrane for a fuel cell according to claim 1, which contains a radical scavenger in a uniformly dispersed state.

6. The electrolyte membrane for a fuel cell according to claim 2, which contains a radical scavenger in a uniformly dispersed state.

7. The electrolyte membrane for a fuel cell according to claim 1, wherein the radical scavenger is at least one selected from the group consisting of $CeO_2$, Ru, Ag, $RuO_2$, $WO_3$, $Fe_3O_4$, $CePO_4$, $CrPO_4$, $AlPO_4$, $FePO_4$, $CeF_3$, $FeF_3$, $Ce_2(CO_3)_3 \cdot 8H_2O$, $Ce(CHCOO)_3 \cdot H_2O$, $CeCl_3 \cdot 6H_2O$, $Ce(NO_3)_6 \cdot 6H_2O$, $Ce(NH_4)_2(NO_3)_6$, $Ce(NH_4)_4(SO_4)_4 \cdot 4H_2O$, $Ce(CH_3COCHCOCH_3)_3 \cdot 3H_2O$, Fe-porphyrin, and Co-porphyrin.

8. The electrolyte membrane for a fuel cell according to claim 2, wherein the radical scavenger is at least one selected from the group consisting of $CeO_2$, Ru, Ag, $RuO_2$, $WO_3$, $Fe_3O_4$, $CePO_4$, $CrPO_4$, $AlPO_4$, $FePO_4$, $CeF_3$, $FeF_3$, $Ce_2(CO_3)_3 \cdot 8H_2O$, $Ce(CHCOO)_3 \cdot H_2O$, $CeCl_3 \cdot 6H_2O$, $Ce(NO_3)_6 \cdot 6H_2O$, $Ce(NH_4)_2(NO_3)_6$, $Ce(NH_4)_4(SO_4)_4 \cdot 4H_2O$, $Ce(CH_3COCHCOCH_3)_3 \cdot 3H_2O$, Fe-porphyrin, and Co-porphyrin.

9. A fuel cell membrane-electrode assembly, which comprises a pair of electrodes composed of a fuel electrode to which fuel gas is supplied and an oxygen electrode to which an oxidizer gas is supplied and a polymer electrolyte membrane sandwiched between the pair of electrodes, wherein the polymer electrolyte membrane is the reinforced electrolyte membrane for a fuel cell according to claim 1.

10. A fuel cell membrane-electrode assembly, which comprises a pair of electrodes composed of a fuel electrode to which fuel gas is supplied and an oxygen electrode to which an oxidizer gas is supplied and a polymer electrolyte membrane sandwiched between the pair of electrodes, wherein the polymer electrolyte membrane is the reinforced electrolyte membrane for a fuel cell according to claim 2.

11. A polymer electrolyte fuel cell comprising a membrane-electrode assembly having the reinforced electrolyte membrane for a fuel cell according to claim 1.

12. A polymer electrolyte fuel cell comprising a membrane-electrode assembly having the reinforced electrolyte membrane for a fuel cell according to claim 2.

13. A method for producing a reinforced electrolyte membrane for a fuel cell, which comprises impregnating a porous substrate with a dispersion liquid of polyelectrolyte containing a radical scavenger wherein the porous substrate is a polytetrafluoroethylene (PTFE) membrane made porous by a stretching method, wherein
   the membrane is produced such that a maximum tensile strength is 35 N/mm$^2$ or more at 80° C. at a relative humidity of 90% in either one of the machine direction (MD) and the transverse direction (TD; vertical to the MD direction) at the time of sheet making; and a relative elongation value, which is obtained by designating either larger one of the elongation degrees in the machine direction (MD) and in the transverse direction (TD) at the maximum tensile strength of the electrolyte membrane in the machine direction (MD) and in the transverse direction (TD) as a denominator, is 0.4 to 1.0 at 80° C. at a relative humidity of 90%.

* * * * *